No. 671,019. Patented Apr. 2, 1901.
L. HAUSMANN.
DRIVE GEAR FOR BICYCLES.
(Application filed Apr. 18, 1900.)
(No Model.) 2 Sheets—Sheet 1.
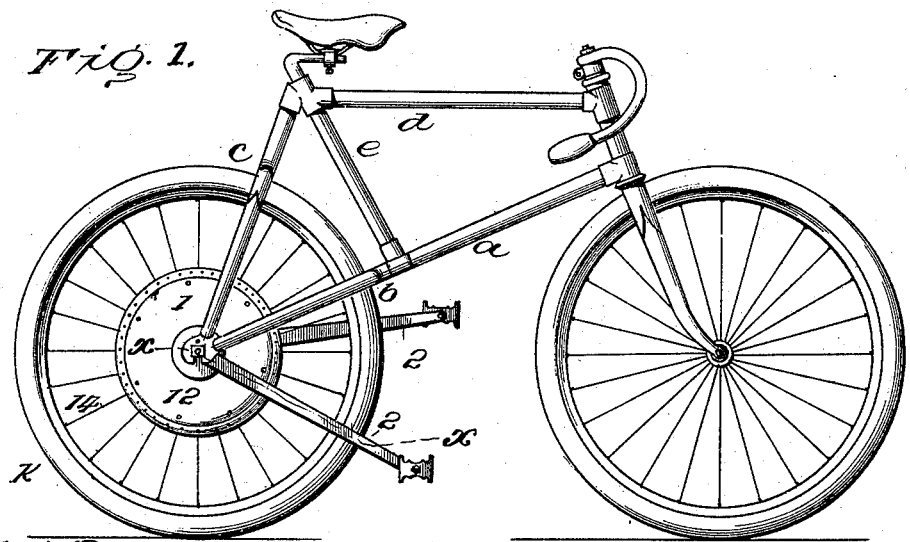
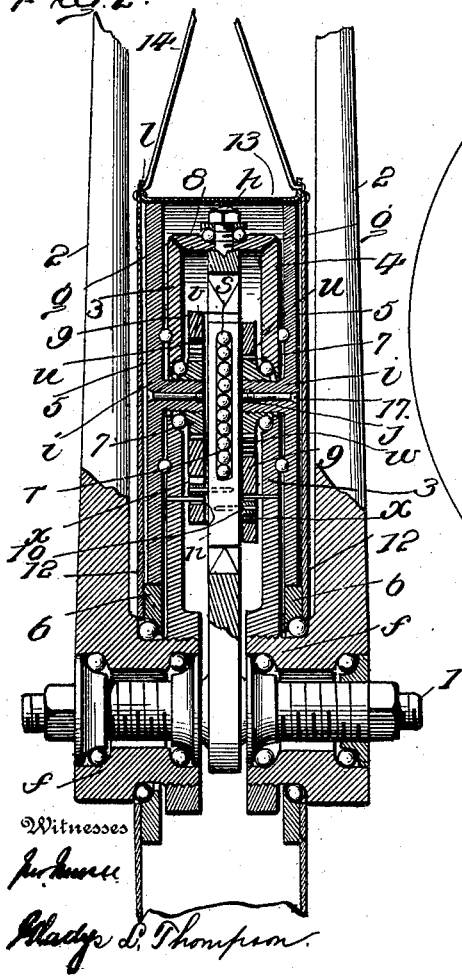
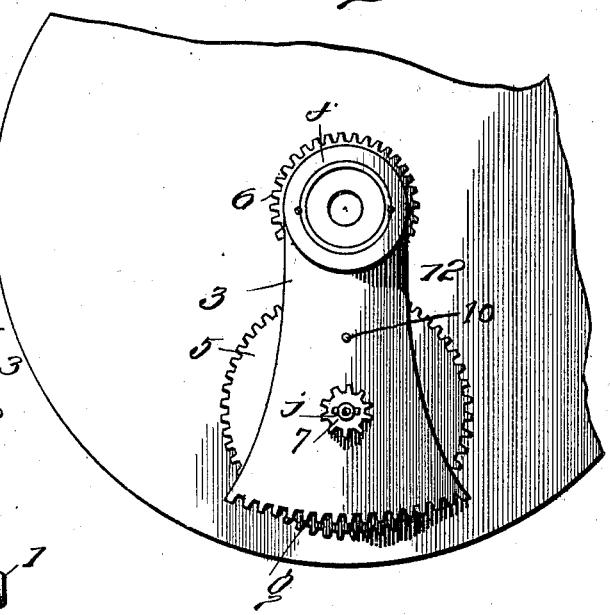
Inventor
Luther Hausmann
Witnesses
By
Attorneys No. 671,019. Patented Apr. 2, 1901.
L. HAUSMANN.
DRIVE GEAR FOR BICYCLES.
(Application filed Apr. 18, 1900.)
(No Model.) 2 Sheets—Sheet 2.
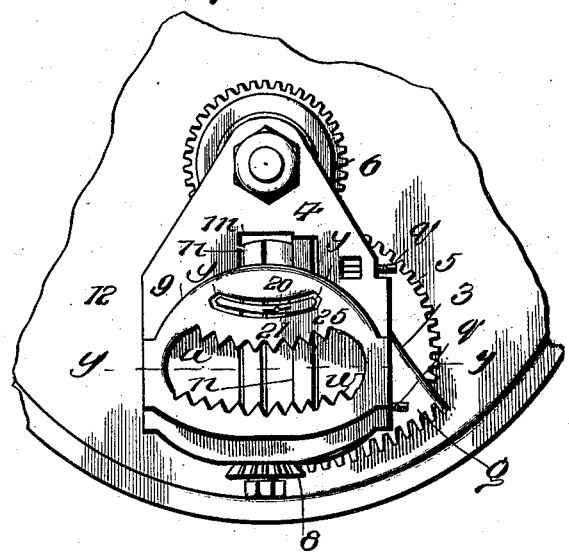
Fig. 4.
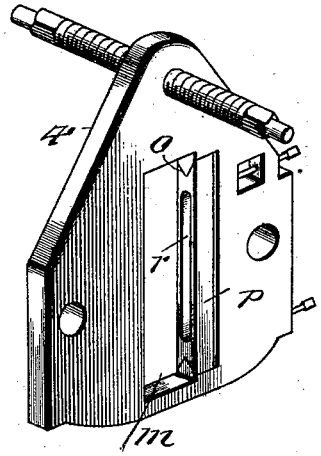
Fig. 8.
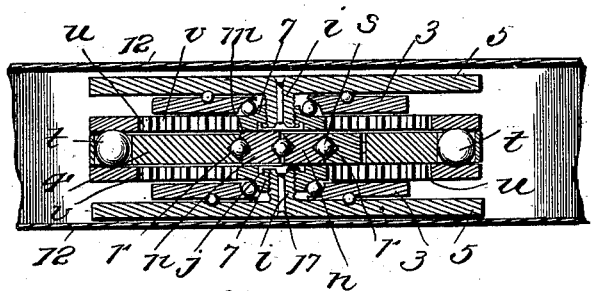
Fig. 5.
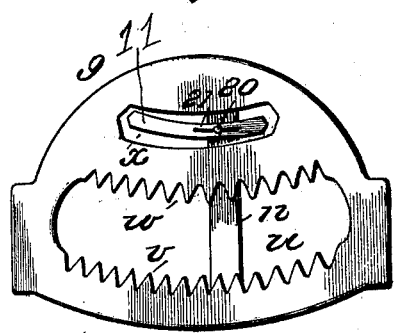
Fig. 7.
Fig. 6.
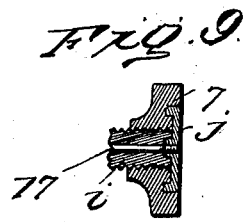
Fig. 9.
Inventor
Luther Hausmann
Witnesses
By R. S. & A. B. Lacey
his Attorneys
THE NORRIS PETERS CO., PHOTO-LITHO., WASHINGTON, D. C.

UNITED STATES PATENT OFFICE.

LUTHER HAUSMANN, OF SPARTA, ILLINOIS.

DRIVE-GEAR FOR BICYCLES.

SPECIFICATION forming part of Letters Patent No. 671,019, dated April 2, 1901.

Application filed April 18, 1900. Serial No. 13,363. (No model.)

*To all whom it may concern:*

Be it known that I, LUTHER HAUSMANN, a citizen of the United States, residing at Sparta, in the county of Randolph and State of Illinois, have invented certain new and useful Improvements in Drive-Gear for Bicycles; and I do hereby declare the following to be a full, clear, and exact description of the invention, such as will enable others skilled in the art to which it appertains to make and use the same.

While the primary purpose of the present invention is to provide a driving mechanism for bicycles and like machines propelled by foot-power, so as to enable the ordinary drive-chain and sprockets and the crank-hanger to be dispensed with and the frame to be lighter and lower, which latter feature is of material advantage in the construction of ladies' and misses' machines, yet it has a broader range, since the mechanism is designed for use wherever it is advantageous and desirable to convert an oscillatory movement into a uniform rotary movement.

The invention consists, essentially, of an oscillating member, constituting the driver, to which the power is applied, a rotary member, being the driven element, a segment-rack mounted for reciprocating movement, a gear element secured to the driver to rotate thereon and arranged for alternate coöperation with the toothed portions of the rack, a switch for shifting the rack, and means for controlling the switch from the driver.

The invention also consists in duplicating the parts, with the exception of the driven element, and combining them in a novel manner for positive actuation of the driven element in alternation, whereby the latter is uniformly rotated, one of the drivers expending energy in the performance of work and the other driver at the same time returning to a starting position preparatory to taking up the load when the first-mentioned driver shall have finished its stroke. The parts are so arranged as to avoid both drivers stopping on a dead-center.

For a full description of the invention and the merits thereof, and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1 is a side elevation of a bicycle, showing the application of the invention. Fig. 2 is a detail section, about on the line X X of Fig. 1, on a larger scale. Fig. 3 is a detail view of the inner crank or driver and the parts attached directly thereto. Fig. 4 is a detail view of the fixed frame to which the segment-racks are attached and directed in their reciprocating movements. Fig. 5 is a transverse section on the line Y Y of Fig. 4. Fig. 6 is a detail perspective view of a segment-rack. Fig. 7 is a detail view showing more clearly the relation of the switch. Fig. 8 is a perspective view of the fixed frame. Fig. 9 is a detail view of the means for securing the gear elements located upon opposite sides of the inner crank or driver.

Corresponding and like parts are referred to in the following description and indicated in all the views of the drawings by the same reference characters.

As shown, the driving mechanism is mounted upon the rear axle 1, which is stationary, being rigidly secured to the terminals of the rear forks of the machine-frame in any well-known manner. By mounting the driving mechanism in this manner it is possible to dispense with the ordinary crank-hanger and drive-chain, the pedal elements being of such relative length as to come within convenient reach of the rider without requiring a too great vertical movement of the pedals. In side elevation the frame of the machine is approximately of half-diamond form, the lower reach-bar *a* and fork *b* being in the same straight line and connected with the rear fork *c* and upper reach *d* by means of the diagonal or seat-post tube *e*.

The pedal elements comprise crank-arms 2, having eyes at their rear ends and mounted upon the axle 1 for oscillatory movement in opposite directions. The eyes formed at the pivotal ends of the arms 2 appear as sleeves or hubs, and ball-bearings are interposed between them and the shaft 1. A crank 3 is secured to the inner end of each eye or sleeve *f*, and its outer end is of segment form and toothed, as indicated at *g*, to mesh with a pinion 8, mounted upon a spindle *h*, projecting from a frame 4, rigidly secured to the shaft 1 intermediate of its ends. By having the toothed segment-cranks 3 connected in the manner stated they receive a simultaneous movement in opposite directions. Hence when depressing the free end of one of the pedal elements the corresponding end of the other pedal element rises, so as to receive the force exerted thereon when the first-mentioned pedal element reaches the limit of its downward stroke. Ball-bearings are interposed between the pinion 8 and the spindle *h*. The toothed segment-crank 3 constitutes the driver, since the force to be expended is imparted thereto. A gear-wheel 5 is mounted upon the outer side of each driver 3 and is formed centrally with a boss *i*, which passes loosely through an opening of the driver and has a pinion 7 rigidly attached to its inner end in such a manner as to cause the parts 5 and 7 to rotate as a single element. A spanner *j* is fitted to the inner end of the boss *i*, and its bent terminals enter the pinion 7 and constitute a lock, said spanner being held in place by means of a machine-screw 17, passing through the gear-wheel 5 and boss *i* and making screw-thread connection with the central portion of the spanner *j*. Ball-bearings are provided between the driver 3 and the gear elements 5 and 7 and centralize the latter with reference to the boss *i* and the opening in the driver, through which said boss passes. A gear-wheel 6 is in meshing relation with the gear-wheel 5 and is the driven element, and power is taken therefrom to rotate the part to be driven, which in the present instance is the rear wheel *k* of the bicycle. The gear-wheel 6 is firmly attached to a side 12 of a cylinder, which houses the drive mechanism and forms a hub for the drive-wheel *k*. The sides 12 of the cylinder are thickest at their center and taper outwardly toward their edges, where they are connected by the rim 13, which has its edge portions outwardly bent, as shown at *l*, to receive the bolts or like fastenings, by means of which the rim 13 and sides 12 are connected, and to which are attached the inner ends of the spokes 14, extending inward from the rim of the wheel.

The frame 4 is stationary, being rigidly attached to the fixed axle 1, and is provided centrally with a radial opening or slot *m*, in which are fitted the bars *n* of the segment-racks 9, said slot being of sufficient length to admit of the reciprocating movements of the bars *n* therein. V-shaped ways *o* are provided at opposite ends of the slot *m*, adjacent to one side thereof, and receive the correspondingly-notched ends of a bar *p*, laterally adjustable, so as to admit of the proper positioning of the bars *n* and provide a means to compensate for wear between the moving parts. Set-screws *q* are threaded into a side portion of the frame 4, and their inner ends bear against opposite end portions of the adjustable bar *p*, and by turning the set-screws in one direction or the other the bar *p* may be advanced or permitted to move outward, according as it is required to contract or widen the opening of slot *m*. The meeting or opposing sides of the several bars *n* and *p* are grooved, as shown at *r*, to form races, in which are fitted balls *s*, by means of which the friction between the moving surfaces is reduced to the smallest degree possible and the parts held in fixed relation. It will thus be seen that the balls *s* perform a double function— that is, to reduce friction and to secure the parts from casual displacement.

The pinion 8 is in line with the opening or slot *m*. Openings are provided in the side portions of the frame 4 and receive balls *t*, whereby friction between the segment-racks 9 and the frame 4 is reduced. The segment-racks 9 consist of plates and are located upon opposite sides of the frame 4 and are provided with bars *n* either formed with or applied thereto and located upon one side thereof. These bars *n* are disposed upon opposite sides of a radius drawn from the axis of the shaft 1, so as to admit of their lying side by side in the opening or slot *m*. A segmental opening *u* is formed in the outer portion of each plate 9, and its opposite edges are toothed, forming racks *v* and *w*. The pinions 7 are adapted to enter the segment-openings *u* in the respective plates and coöperate with the toothed edges or racks *v* and *w* thereof. It is to be remembered that the drivers or segment-cranks 3 have an oscillatory movement imparted thereto, and in the forward movement of the driver one of the racks, as *v*, meshes with the pinion 7, and in the backward movement of the said driver the other rack, as *w*, meshes with the pinion 7. It will thus be seen that the pinion 7 is driven uniformly in the same direction, whether the driver oscillates forwardly or backwardly. An arcuate slot *x* is provided in the inner portion of each plate or segment-rack 9 and parallels the racks *v* and *w*, and its ends are oppositely inclined, as shown at *y*. A switch 11 is located in the slot *x* and consists of a curved bar of less length than said slot, having its ends oppositely inclined to conform to the inclined ends *y* of the said slot. The switch is wider at its ends than at its center and is mounted upon a pin 20, projecting outwardly from the bar *n* of the plate with which the switch coöperates. A spring 21 is secured to the pin 20 and to the switch and normally tends to hold the latter diagonally disposed with reference to the slot *x*. A pin 10 projects laterally from the driver and enters the slot *x* and is adapted to travel in the space formed between the opposing edges of said slot and the switch and is the means for shifting the segment-rack and holding one or the other set of teeth *v* and *w* in positive engagement with the teeth of the pinion 7, according to the direction of travel of the said pinion with reference to the driver, to which it is attached. When the driver reaches the limit of its movement in one direction, the pin 10 passes from one side of the switch 11 to the opposite side, thereby shifting the segment-rack radially and throwing the teeth $w$ out of engagement with the pinion and the teeth $v$ into engagement with said pinion. On the return stroke of the driver power is not imparted to the pinion 7, and since the drivers are mounted for simultaneous movement in the opposite direction it will be understood that when one driver is returned to a starting position another driver is advancing and carrying the load and imparting movement to the part to be driven.

While the mechanism herein described is admirably adapted for driving bicycles and kindred machines commonly propelled by foot-power, it can also be utilized for imparting motion to machinery where it is required to convert an oscillatory movement into a uniform rotary motion. When applied to bicycles, the frame can be of lighter construction, since the strain comes directly upon the rear axle, and its embodiment in the construction of ladies' and misses' wheels enables the frame to be low down and avoids a high step in mounting and dismounting, which is of material advantage.

The sides 12 of the cylinder are readily removable to admit of access being easily had to the working elements of the drive-gear for cleaning, oiling, and repairs. The spokes 14 are attached at their inner ends solely to the outer flanges $l$ of the rim 13, so as to admit of the detachment of the sides 12.

When resting on the pedals, as when going downgrade or speeding over smooth roads, with one foot up and the other down, the segment-racks will stand apart—i. e., one forward and the other rearward—a maximum distance, with the pinions 7 at opposite ends of the slots $u$ and rotating against the inclined end walls thereof.

Having thus described the invention, what is claimed as new is—

1. In drive-gear of the character described, an oscillatory driver, a rotary driven element, a segment-rack, connected gears carried by the driver and adapted to coöperate with, respectively, the driven element and the segment-rack, a switch located wholly in the plane of the segment-rack and consisting of a curved bar pivoted between its ends thereto, and a pin applied to the driver to act jointly with the pivoted switch-bar to effect a shifting of the segment-rack, substantially as specified.

2. In drive-gear of the character described, an oscillatory driver, a rotary driven element, a segment-rack mounted to receive a reciprocating movement and having an arcuate slot substantially parallel with the rack portions, connected gears arranged to coöperate with the driven element and segment-rack, a switch consisting of a curved bar located in the aforesaid arcuate slot and pivoted to the segment-rack intermediate of its ends, and a pin projecting from the driver and adapted to operate in the space formed between the switch and the walls of the arcuate slot to effect a shifting of the said rack, substantially as specified.

3. In drive-gear of the character described, an oscillatory driver, a rotary driven element, a segment-rack having an arcuate slot with its end portions oppositely inclined, connected gears carried by the driver and coöperating with the driven element and segment-rack, a switch consisting of a curved bar of less length than the arcuate slot and pivoted between its terminals therein and having its ends oppositely inclined, and a pin carried by the driver and adapted to travel in the space formed between the switch and the walls of the arcuate slot to effect a shifting of the segment-rack, substantially as specified.

4. In drive-gear of the character described, an oscillatory driver, a rotary driven element arranged upon one side of the driver, a segment-rack located upon the opposite side of said driver, gear elements of different diameters placed against opposite sides of the driver and connected for simultaneous rotation, the larger gear element intermeshing with the driven part and the smaller gear element adapted to alternately coöperate with the toothed portions of the segment-rack, and coöperating means between the driver and segment-rack to effect a positive shifting of the latter at the completion of each stroke of the driver, substantially as set forth.

5. In drive-gear of the character described, a fixed frame having a guide-slot, a segment-rack placed against said frame and having an offstanding bar to reciprocate in the guide-slot thereof, an oscillatory driver, a rotary driven element, connected gears carried by the driver and adapted to coöperate with the driven element and rack-bar, and means conjunctively related with reference to the driver and segment-rack to effect a shifting of the latter at the completion of the stroke of the driver in each direction, substantially as specified.

6. In drive-gear of the nature described, a fixed frame having a guide-slot about centrally thereof, a segment-rack having a laterally-extending bar guided in its reciprocating movements by the guide-slot of said frame, an oscillatory driver, connected gears carried by the driver, one of the gears coöperating with the segment-rack, a driven element in meshing relation with the other gear, and means substantially as set forth for effecting a shifting of the segment-rack, substantially as described.

7. In a drive-gear of the character specified, a frame having a slot, a bar forming a side of said slot, means for adjusting said bar laterally to increase or diminish the width of the said slot, a segment-rack adapted to have a reciprocating movement imparted thereto and provided with a laterally-extending bar fitting in the slot of the aforementioned frame and directed in its reciprocating movements thereby, an oscillatory driver, a rotary driven element, connected gears carried by the driver and adapted to coöperate with the driven element and the segment-rack, and means for effecting a positive shifting of the segment-rack at the end of the stroke of the driver in each direction, substantially as set forth.

8. In a drive-gear of the character described, a frame having a guide-slot, a laterally-adjustable bar forming a side of said slot, a segment-rack having a laterally-extending bar fitted into the said guide-slot, the opposing sides of the guide-slot and bars being grooved, balls located in the said grooves and serving to reduce friction and to hold the segment-rack to the frame, an oscillatory driver, a rotary driven element, connected gears carried by the driver and disposed to coöperate with the driven element and segment-rack, and means for shifting the segment-rack, as and for the purpose specified.

9. In combination, a fixed frame, driven elements located upon opposite sides of said frame, segment-racks disposed one at each side of the frame and directed in their reciprocating movements thereby, oppositely-disposed segment-cranks, a pinion mounted upon the fixed frame and intermeshing with the segment-cranks to cause a simultaneous movement thereof in opposite directions, connected gears carried by the segment-cranks and coöperating with the driven element and segment-racks, and means for shifting the segment-racks in opposite directions, substantially as set forth.

10. In drive-gear of the character described, a fixed frame having a guide-slot, segment-racks located at the sides of the frame and having offstanding bars entering the guide-slot thereof and lying side by side, oppositely-disposed oscillatory drivers, rotary driven elements, means for causing a simultaneous movement of the drivers in opposite directions, connected gears carried by the drivers, and means for alternately shifting the segment-racks simultaneously in opposite directions, substantially as and for the purpose set forth.

11. In drive-gear of the character described, a fixed frame, a cylinder constituting a housing for the operating parts and forming the driven element, oscillatory drivers coaxially mounted with reference to the cylinder and connected for simultaneous movement in opposite directions, segment-racks located upon opposite sides of the fixed frame and directed in their reciprocating movements thereby, gear-wheels secured to the sides of the cylinder, connected gears carried by the oscillatory drivers and coöperating with the gear-wheels attached to the sides of the cylinder and with the segment-racks, and means for effecting a shifting of the segment-racks simultaneously in opposite directions, substantially as set forth.

12. In drive-gear for bicycles and the like, a cylinder constituting the hub portion of the drive-wheel, and a housing for the driving mechanism, a rim, spokes connecting the rim with the cylinder, pedal elements mounted coaxially with the axis of the drive-wheel, oscillatory drivers attached to the respective pedal elements for simultaneous action in opposite directions, gear-wheels secured to the sides of the cylinder, connected gears of different diameters carried by the respective drivers, oppositely-disposed segment-racks mounted to reciprocate in opposite directions, and means for shifting the said racks, substantially as set forth.

13. In combination, a fixed axle, a frame rigidly attached to said axle, a cylinder concentric with and mounted upon the axle and constituting the hub portion of a drive-wheel and having gear-wheels attached to its sides, pedal elements loosely mounted upon the axle, oscillatory drivers secured to the pedal elements and having toothed segment portions, a pinion mounted upon the fixed frame and meshing with the teeth of the said drivers, segment-racks located upon opposite sides of the fixed frame and directed in their reciprocating movements thereby, connected gears carried by the respective drivers and coöperating with the gear-wheels at the sides of the cylinder and with the segment-racks, switches attached to the segment-racks, and means coöperating with the switches to shift the segment-racks, as and for the purpose set forth.

In testimony whereof I affix my signature in presence of two witnesses.

LUTHER HAUSMANN. [L. S.]

Witnesses:
JOHN F. CARSON,
HENRY HEIL.